(12) United States Patent
Paillard et al.

(10) Patent No.: US 10,767,512 B2
(45) Date of Patent: Sep. 8, 2020

(54) PARTICLE-TRAPPING DEVICE FOR A TURBOMACHINE AND TURBOMACHINE WITH SUCH A DEVICE

(71) Applicant: SAFRAN HELICOPTER ENGINES, Bordes (FR)

(72) Inventors: Amaury Paillard, Bourdettes (FR); Stephane Pascaud, Pau (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 232 days.

(21) Appl. No.: 15/758,337

(22) PCT Filed: Sep. 8, 2016

(86) PCT No.: PCT/FR2016/052241
§ 371 (c)(1),
(2) Date: Mar. 7, 2018

(87) PCT Pub. No.: WO2017/042493
PCT Pub. Date: Mar. 16, 2017

(65) Prior Publication Data
US 2018/0266278 A1 Sep. 20, 2018

(30) Foreign Application Priority Data
Sep. 10, 2015 (FR) ...................................... 15 58437

(51) Int. Cl.
*B01D 39/00* (2006.01)
*F01D 25/32* (2006.01)
(Continued)

(52) U.S. Cl.
CPC .............. *F01D 25/32* (2013.01); *F02C 3/145* (2013.01); *F02C 7/052* (2013.01); *F23R 3/04* (2013.01);
(Continued)

(58) Field of Classification Search
CPC .... F01D 25/32; F23R 3/54; F23R 3/04; F02C 3/145; F02C 7/052; Y02T 50/672;
(Continued)

(56) References Cited

U.S. PATENT DOCUMENTS 2,554,601 A * 5/1951 Sutton .................... F04D 29/646
415/182.1
2,616,355 A * 11/1952 McCabe ................ F24F 13/062
454/312
(Continued)

FOREIGN PATENT DOCUMENTS

EP 1793086 A2 6/2007
EP 2899465 A1 7/2015

OTHER PUBLICATIONS

Preliminary Research Report received for French Application No. 1558437, dated May 12, 2016, 3 pages (1 page of French Translation Cover Sheet and 2 page of original document).
(Continued)

*Primary Examiner* — Dung H Bui
(74) *Attorney, Agent, or Firm* — Womble Bond Dickinson (US) LLP

(57) ABSTRACT

The invention relates to a particle-trapping device (2) for a turbomachine, said particles being contained in an air stream flowing inside a turbomachine, in particular the air stream flowing in the bypass region (17) of the combustion chamber (13) of said turbomachine. The device is characterized in that it comprises: —at least two particle deflectors (3, 3a, 3b, 3c), —a member (5) for collecting and storing the particles deflected by said deflector, —and means (6) for attaching said trapping device (2) to a part of the turbomachine.

9 Claims, 4 Drawing Sheets

(51) Int. Cl.
F02C 3/14 (2006.01)
F02C 7/052 (2006.01)
F23R 3/04 (2006.01)
F23R 3/54 (2006.01)

(52) U.S. Cl.
CPC .......... *F23R 3/54* (2013.01); *F05D 2220/329* (2013.01); *F05D 2240/35* (2013.01); *F05D 2260/607* (2013.01); *Y02T 50/672* (2013.01); *Y02T 50/675* (2013.01)

(58) Field of Classification Search
CPC ............. Y02T 50/675; F05D 2260/607; F05D 2220/329; F05D 2240/35
See application file for complete search history.

(56) References Cited

U.S. PATENT DOCUMENTS

| | | | | |
|---|---|---|---|---|
| 2,690,203 | A * | 9/1954 | Davies | B21D 11/06 |
| | | | | 72/70 |
| 2,704,089 | A * | 3/1955 | Woodworth | F23R 3/04 |
| | | | | 138/37 |
| 2,772,624 | A * | 12/1956 | Carnes | F24F 13/062 |
| | | | | 454/312 |
| 2,811,094 | A * | 10/1957 | Auer | F24F 13/062 |
| | | | | 454/310 |
| 2,837,990 | A * | 6/1958 | Tutt | F24F 13/062 |
| | | | | 454/300 |
| 2,901,958 | A * | 9/1959 | Carnes | F24F 13/062 |
| | | | | 454/312 |
| 2,994,259 | A * | 8/1961 | O'Day | F24F 13/062 |
| | | | | 454/300 |
| 3,371,471 | A | 3/1968 | Connors | |
| 3,717,081 | A * | 2/1973 | Jakimas | F24F 13/06 |
| | | | | 454/312 |
| 3,854,386 | A * | 12/1974 | Hedrick | F24F 13/06 |
| | | | | 454/299 |
| 4,704,145 | A | 11/1987 | Norris et al. | |
| 4,884,497 | A * | 12/1989 | Dosmann | F24F 13/06 |
| | | | | 454/300 |
| D317,819 | S * | 6/1991 | Sello | D23/390 |
| 5,259,726 | A * | 11/1993 | Bacria | F04D 29/703 |
| | | | | 415/119 |
| 6,991,534 | B2 * | 1/2006 | Koessler | F24F 13/062 |
| | | | | 454/300 |
| 7,400,057 | B2 * | 7/2008 | Sureshan | F03D 1/04 |
| | | | | 290/55 |
| 7,662,036 | B2 * | 2/2010 | Mhatre | F24F 13/084 |
| | | | | 454/300 |
| 8,461,715 | B2 * | 6/2013 | Lee | F03D 1/04 |
| | | | | 290/55 |
| 9,593,885 | B2 * | 3/2017 | Cuerdon | E04H 5/12 |
| 9,664,408 | B2 * | 5/2017 | Monzon | F24F 13/082 |

OTHER PUBLICATIONS

International Search Report and Written Opinion received for PCT Patent Application No. PCT/FR2016/052241, dated Dec. 19, 2016, 21 pages (10 pages of English Translation and 11 pages of Original Document).

International Preliminary Report on Patentability received for PCT Patent Application No. PCT/FR2016/052241, dated Mar. 22, 2018, 18 pages (10 pages of English Translation and 8 pages of Original Document).

* cited by examiner

PARTICLE-TRAPPING DEVICE FOR A TURBOMACHINE AND TURBOMACHINE WITH SUCH A DEVICE

GENERAL TECHNICAL FIELD

The invention is located in the field of turbomachines equipping in particular airplanes or helicopters.

It relates more precisely to a particle-trapping device for turbomachines, these particles being in particular grains of sand or dust, contained in the air flow circulating inside said turbomachine. This trapping device is more particularly designed to be disposed in the bypass area of the combustion chamber of a turbomachine.

The invention also relates to a turbomachine equipped with such a trapping device.

PRIOR ART

Figure 1:
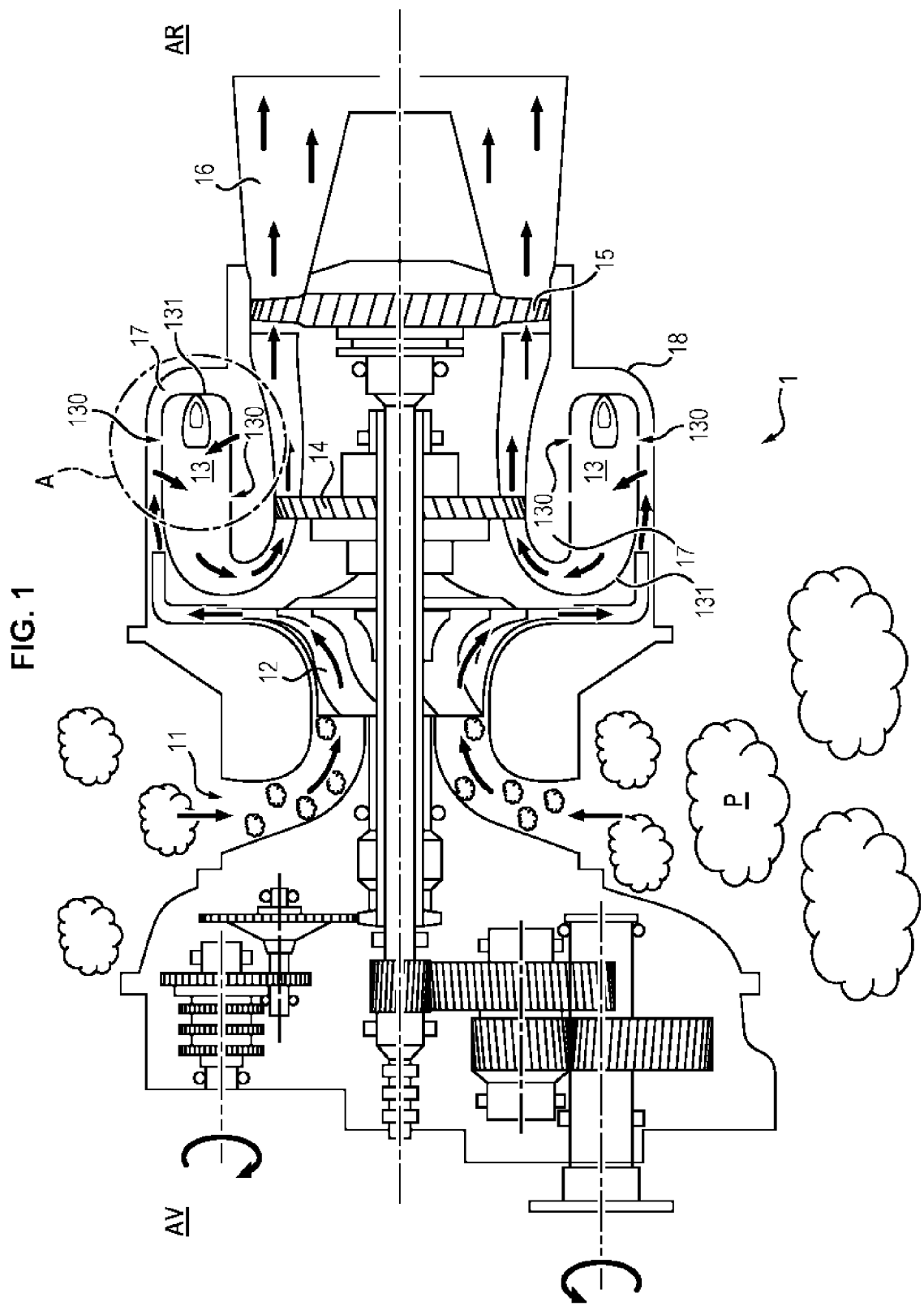

As can be seen on the schematic of the appended FIG. 1, a turbomachine 1 generally comprises, from upstream to downstream, in the gas flow direction, an air intake 11, one or more compressor stages 12 (for example, a single one in said figure), an annular combustion chamber 13, one or more turbine stages, for example one high-pressure turbine 14 and one low-pressure turbine 15, and finally a gas exhaust nozzle 16.

Hereafter in the description and claims and in the figures, the terms "front" (reference AV) and "rear" (reference AR) are used when referring to the disposition of the turbomachine on the airplane or the helicopter.

Air is drawn in at the air intake 11, is compressed in the compressor 12, then is directed to the bypass area 17 of said combustion chamber 13.

During the operation of the turbomachine, the walls 131 of the combustion chamber 13 are subjected to very high temperatures. The cooling of these walls is then generally carried out by the circulation of air leaving the compressor 12, through multiple perforation, i.e. very numerous holes of very small diameter provided in the walls 131 of said combustion chamber.

Only a few of these holes, referenced 130, have been shown in FIG. 1.

The air and the hot combustion gases leaving the combustion chamber 13 are then sent to the turbines 14, 15 and the exhaust nozzle 16.

Now it has been noted that when the machine equipped with said turbomachine carries out a flight in a dusty or sandy atmosphere, for example in a desert, clouds of particle P, such as grains of sand and dust, are ingested at the air intake 11.

These particles P then reach the bypass area 17 and end up obstructing the holes 130 provided in the walls 131 of the combustion chamber 13.

Now if these holes 130 are obstructed, the air can no longer circulate in the combustion chamber 13, the cooling of its walls 131 is no longer provided for and the combustion chamber deteriorates rapidly in contact with the flames.

A known device allowing the particles P ingested by the turbomachine to be retained is an air intake screen, located at the air intakes 11, which allows a portion of the foreign bodies to be retained before their penetration into the turbomachine.

However, particles P having a size smaller than the mesh of the screen are ingested.

It is not in fact practicable to install a filter with finer mesh, at the air intake, because this would cause too high a head loss and would cause a drop in the performance of the engine.

Already known from document U.S. Pat. No. 3,371,471, is a particle-trapping device designed to be placed at the air intake of an engine of a gas turbine. Such a device comprises a series of curved baffles which is struck by the entering air flow. The particles retained by these baffles are collected in an annular dust-recovery device.

However, such a device is not compact and is not designed to be installed in the bypass area of the combustion chamber of a turbomachine.

In addition, the baffles have the effect of slowing the circulation of the air flow and to cause a considerable head loss.

PRESENTATION OF THE INVENTION

The invention therefore has the objective of resolving the aforementioned disadvantages of the prior art and to supply a particle-trapping device which allows them to be retained, or at least a large part of them, before they can obstruct the holes provided in the walls of the combustion chamber.

Another objective of the invention is to propose such a trapping device which does not alter the operating performance of the turbomachine, and particularly does not modify the circulation of the air thereinside.

Another objective of the invention is to propose a compact trapping device.

Finally, advantageously, such a trapping device must also allow the temporary storing of the trapped particles, followed by their removal during maintenance operations of the turbomachine so as to avoid an accumulation of these particles in the trapping device.

To this end, the invention relates to a turbomachine particle-trapping device, these particles being in particular grains of sand or dust, contained in an air flow circulating inside a turbomachine, particularly the air flow circulating in the bypass area of the combustion chamber of said turbomachine.

In conformity with the invention, the device comprises:
at least two particle deflectors,
an element for collecting and storing particles deflected by said deflectors,
means for attaching said trapping device on a portion of the turbomachine,
said deflectors having an annular shape and being attached to at least one support frame, so as to be coaxial, to be radially aligned and to be spaced radially from one another or from each other, said deflectors being inclined in the same direction with respect to their axes of revolution so as to be turned toward said particle collecting and storing element.

Thanks to these features of the invention, all the particles that strike against the deflector(s) are driven back toward the particle collecting and storing element and do not obstruct the holes provided in the wall of the combustion chamber.

This device further has the advantage of being very compact.

According to other advantageous and non-limiting features of the invention, taken alone or in combination:
said support frame is a ring which extends in a plane perpendicular or substantially perpendicular to the axis of revolution of the deflectors, the deflectors of a pair of contiguous deflectors are attached respectively along the outer circular edge and the inner circular edge of said annular support frame and this support frame is perforated with openings for passage of the air flow;

the inner face of a deflector has an angle of inclination with respect to said axis of revolution that is greater than the angle of inclination with respect to this same axis of revolution of the inner face of a deflector disposed radially further inside the device;

the inner radius of an outermost deflector of a pair of contiguous deflectors is less than or equal to the outer radius of a deflector located further inside;

the device comprises three deflectors;

at least one of said deflectors has a rectilinear cross section;

at least one of said deflectors has a curved cross section, the concavity whereof is turned toward the particle collecting and storing element;

the collecting and storing element comprises a solid ring coaxial with the axis of revolution of the deflectors and which extends in a plane perpendicular or substantially perpendicular to this axis, this ring being continued in the direction of said deflector by a solid outer annular edge and by a solid inner annular edge, said collecting and storing element being disposed facing the deflector;

said attachment means comprise a planar annular flange coaxial with the axis of revolution of the deflectors and perpendicular to it, and which is continued in the direction of the particle collecting and storing element by a cylinder with a longitudinal axis coaxial with said axis of revolution, in that said cylinder is perforated with several openings for passage of the air flow and in that said annular flange is perforated with several openings for passage of attachment members.

Finally, the invention also relates to a turbomachine comprising a combustion chamber and a bypass area provided between the wall of said combustion chamber and an outer casing of said turbomachine, this turbomachine being equipped with the aforementioned particle-trapping device and the device is disposed inside said by-pass area.

PRESENTATION OF THE FIGURES

Other features and advantages of the invention will appear from the description which will now be made with reference to the appended drawings, which show a possible embodiment of it by way of indication and without limitation.

Figure 2:
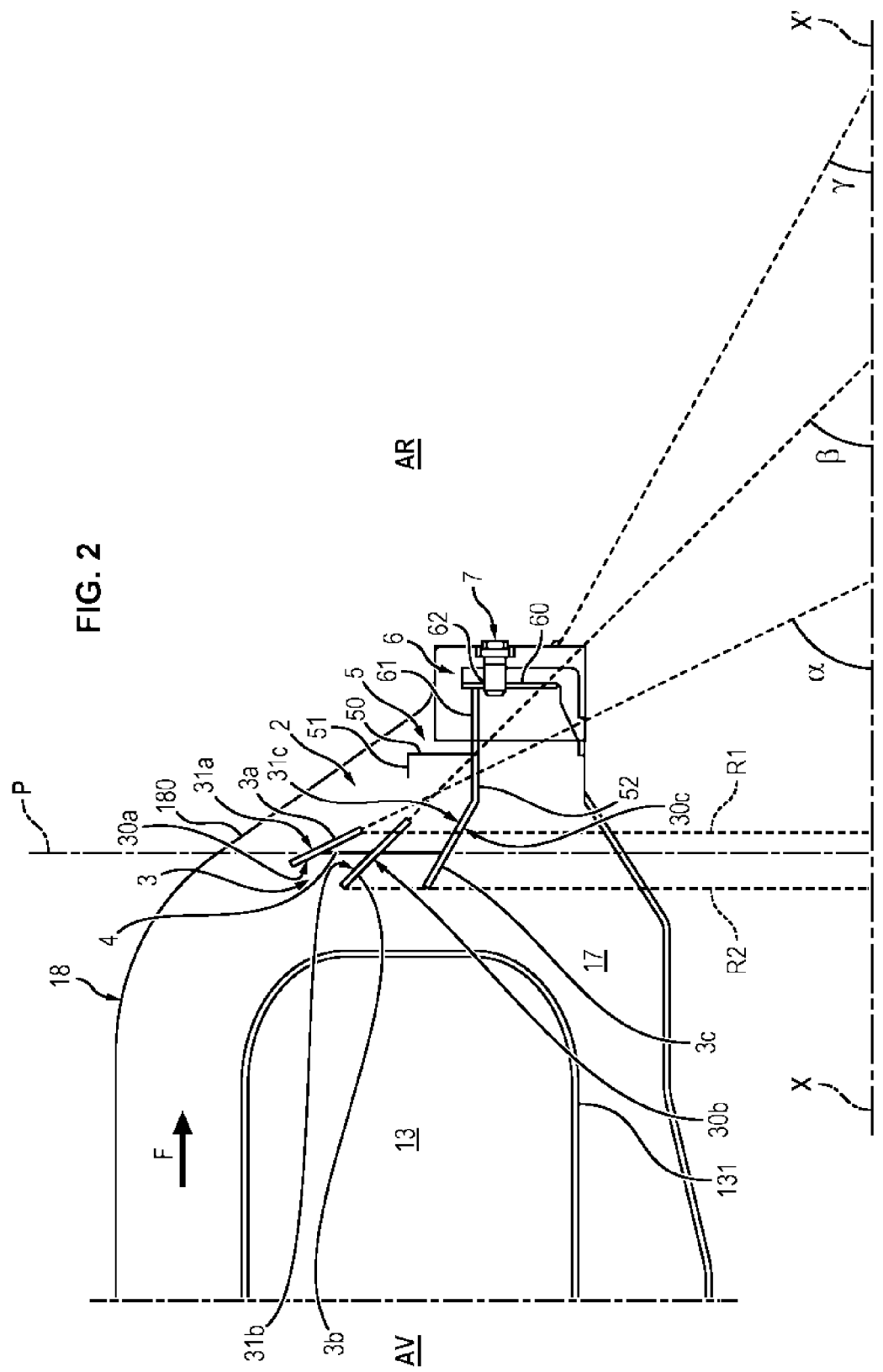
Figure 3:
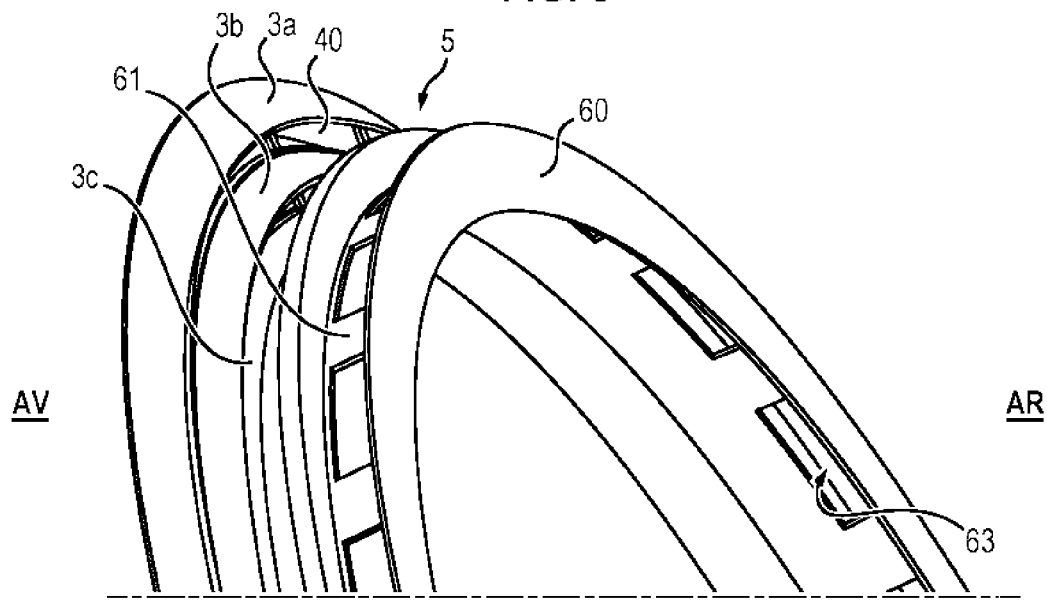
Figure 4:
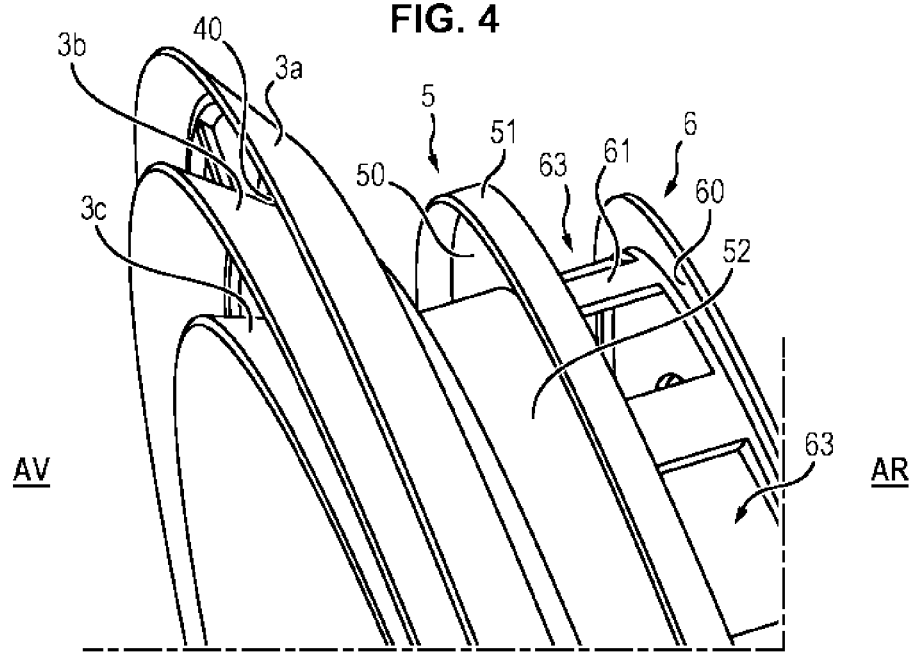
Figure 5:
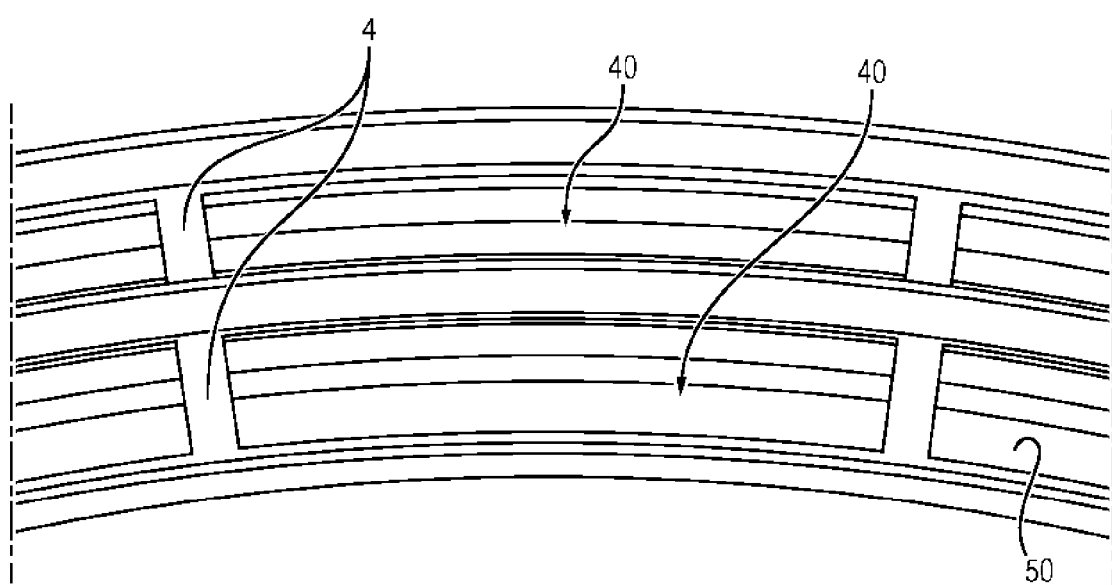

In these drawings:

FIG. 1 is a schematic view in longitudinal section of an exemplary embodiment of a turbomachine, FIG. 2 is a view of detail A of FIG. 1, on which has further been shown the trapping device conforming to the invention, FIGS. 3, 4 and 5 are partial perspective views of an embodiment of the trapping device conforming to the invention, taken from three different angles of observation.

DETAILED DESCRIPTION

The particle-trapping device conforming to the invention bears the general reference 2.

As can be seen in FIG. 2, this device 2 is designed to be positioned in the bypass area 17 of the combustion chamber 13, more precisely outside the wall 131 of the combustion chamber 13 and inside the outer casing 18 of the turbomachine.

However, its exact position will be determined by calculation, depending on the trajectory of the particles contained in the air flow circulating inside this bypass area 17. This calculation also takes into account the respective shapes of the wall 131 and of the portion of the wall 180 of the outer casing 18, located facing the rear end of the combustion chamber 13.

The trapping device will thus be advantageously disposed at the place where it will allow a maximum of particles to be collected, before they reach the holes 130 of the wall of the combustion chamber.

A particular embodiment of this trapping device 2 will now be described with reference to FIGS. 2 to 5.

This trapping device 2 preferably comprises, from the front AV toward the rear AR, at least two deflectors 3, a particle collecting and storing element 5 and means 6 for attaching said storing device on a portion of the turbomachine.

All these elements are constructed of a material which resists heat and preferably also the abrasion of particles, for example metal or a composite material.

These different elements will now be described in more detail.

The device comprises at least two deflectors 3, for example three as shown in the figures. It is also possible to have more than three deflectors.

Each deflector has the shape of a ring, with axis of revolution X, X'. The different deflectors 3 are attached to a support frame 4, so as to be coaxial with the axis X-X' and spaced radially from one another.

In the example described and shown in FIG. 3, these deflectors are called the "outer" 3a, "median" 3b and "inner" 3c deflectors, the outer deflector being that with the largest diameter and thus located outermost. Each deflector is constituted by an element having the shape of a solid blade with a small width closed on itself in the form of a ring.

All these deflectors 3a, 3b, 3c are further attached to the frame 4 so as to be inclined in the same direction with respect to their common axis of revolution X-X', i.e. inclined from the outside and the front toward the axis of revolution X-X' and the rear AR. In other words, they have the shape of a frusto-conical ring. However, their angles of inclination are preferably different. These deflectors are turned toward the element 5.

Finally, the deflectors 3, 3a, 3b, 3c are attached to the frame 4 so as to be aligned radially and not to be offset along the axis X-X', so as not to occupy too much space between the wall 130 of the combustion chamber and the wall 180 of the casing and not to restrain the flow of the air flow which circulates at this location.

By "radially aligned" is meant that all the deflectors 3a, 3b, 3c cut the same plane referred to as P, perpendicular to their respective axes of revolution X-X', these axes being congruent.

The inner face 30a of the outer deflector 3a (i.e. the face turned toward the axis X-X') forms an angle α with the axis of revolution X-X', the inner face 30b of the median deflector 3b forms with the axis X-X' an angle β and finally the inner face 30c of the inner deflector 3c forms an angle γ with the axis X-X'. As can be observed in FIG. 2, the angle α is greater than the angle β which is itself greater than the angle γ.

Preferably, the angle α is comprised between 65° and 75°, more preferably equal to 70°, the angle β is comprised between 45° and 55°, more preferably equal to 50°, the angle γ is comprised between 25° and 35°, more preferably equal to 30°.

Preferably, as can be seen in FIG. 2, the deflectors 3a, 3b and 3c have a rectilinear cross section. However, this can be curved, its concavity being oriented toward the particle collecting and storing element 5.

As appears better in FIGS. 2, 4 and 5, the frame 4 plays the role of a cross-member between two contiguous deflectors. It has the shape of a ring which extends in a plane perpendicular or substantially perpendicular to the axis of revolution X-X', for example the plane P. The frame 4 is perforated with openings 40 allowing the passage of the air flow. These openings 40 are advantageously distributed at regular intervals and preferably constitute a large portion of the surface of the frame 4. They also allow the frame to be lightened.

In the case where the trapping device 2 comprises more than two deflectors, for example three as in the figures, it then comprises a frame 4 between each contiguous deflector wall (see FIG. 5). The deflectors of a pair of contiguous deflectors are fixed respectively along the outer circular edge and the inner circular edge of the annular frame 4.

Advantageously, the deflectors 3, 3a, 3b, 3c are attached to the frames 4 by welding.

As appears better in FIGS. 2 and 4, preferably the particle collecting and storing element 5 comprises a solid ring 50 coaxial with the axis of revolution X-X' of the deflectors 3a to 3c which extends in a plane perpendicular or substantially perpendicular to this axis.

Preferably there is a single collection element 5 for all the deflectors 3, 3a, 3b, 3c.

This ring 50 is continued forward AV by a solid outer annular edge 51 and by a solid inner annular edge 52.

Preferably, the inner annular edge 52 is located in the continuation of the rear edge of the innermost deflector 3c. More preferably, these two elements form only the same single part.

This element 5 therefore has the general shape of a gutter oriented facing the deflectors 3, 3a, 3b, 3c.

Finally, as is most visible in FIGS. 2 to 4, preferably the attachment means 6 comprise a planar annular flange 60, coaxial with the axis of revolution X-X' of the deflectors and perpendicular to this axis X-X', and which is continued forward by a cylinder 61 with longitudinal axis X-X'.

The flange 60 is perforated with several openings 62 which allow the passage of attachment members 7, such as for example screws. These screws allow the flange to be attached to a portion of the turbomachine.

The cylinder 61 is perforated with a plurality of openings 63 allowing the passage of the air flow circulating inside the turbomachine. Similarly to what has been described for the frames 4, these openings 63 represent a considerable portion of the surface of the cylinder 61, so as not to slow or restrain the flow of the air. The also contribute to reduce the overall mass of the device.

The cylinder 61 is linked to the particle storing element 5. Preferably, the cylinder 61 is welded to the inner end of the ring 50 of the element 5.

The operation of the device is the following.

The air originating in the compressor 12, charged with particles P, penetrates inside the bypass area 17, from the front AV to the rear AR between the outer wall 131 of the combustion chamber 13 and the casing 18 (arrow F in FIG. 2).

This air flow charged with particles strikes the wall 180, so that the particles ricochet (bounce) against it and then strike the outer faces 31a, 31b, 31c of the deflectors 3a, 3b and 3c oriented toward this wall 180. The run of the particles is slowed, these slide inwardly (toward the axis X-X'), along the deflectors until they are assembled and collected in the element 5, from which they cannot depart because the walls of it are solid.

The openings 40, however, allow the impact of the trapping device 2 on the circulation of the air flow to be limited, and therefore limits the head losses. In other words, the particles are retained by the element 5 but the air flow can continue to circulate around the outer walls 131 of the combustion chamber 13, so as to penetrate into the holes 130 and to provide the function of cooling these walls.

Finally, it will be noted that, advantageously, the inner radius R1 of the outer deflector 3a (i.e. its smaller radius) is less than or equal to the outer radius R2 of the contiguous median deflector 3b (i.e. its larger radius). The same can be true for each pair of contiguous deflectors.

Thus, if a particle were to ricochet against the wall 180 of the casing 18 and went back toward the front in a direction parallel to the axis X-X', it would unavoidably be trapped by the outer deflector 3a.

Calculations of trajectories of particles must be carried out for each turbomachine, depending on the shape of the walls delimiting the bypass area 17 of the combustion chamber, so as to best position the particle trap 2, in order for it to retain the virtual totality of particles ingested by the turbomachine and entering into the bypass of the combustion chamber.

In addition, the values of the angles $\alpha$, $\beta$ and $\gamma$ are also adjusted depending on the shape of the wall 180 and can be different from those previously mentioned.

During maintenance operations of the turbomachine, the particles trapped in the element 5 can then be removed to avoid their accumulation.

The invention claimed is:

1. A turbomachine comprising a combustion chamber and a bypass area provided between a wall of said combustion chamber and an outer casing of said turbomachine, wherein the turbomachine is equipped with a particle-trapping device disposed inside said bypass area, said particle-trapping device comprising:
    at least two particle deflectors for deflecting grains of sand or dust particles, contained in an air flow circulating inside the bypass area of the combustion chamber of said turbomachine,
    at least one support frame,
    an element for collecting and storing particles deflected by the at least two particle deflectors,
    means for attaching said trapping device on a portion of the turbomachine,
    said particle deflectors having an annular shape and being attached to the at least one support frame so as to be coaxial, to be radially aligned and to be spaced radially from one another or from each other, said deflectors being inclined in the same direction with respect to their axes of revolution (X-X') so as to be turned toward said element for collecting and storing particles.

2. The turbomachine according to claim 1, wherein said support frame is a ring which extends in a plane perpendicular or substantially perpendicular to the axis of revolution (X-X') of the deflectors, in that the deflectors of a pair of contiguous deflectors are attached respectively along the outer circular edge and the inner circular edge of said annular support frame and in that this support frame is perforated with openings for passage of the air flow.

3. The turbomachine according to claim 1, wherein the inner face of a deflector has an angle of inclination ($\alpha,\beta$) with respect to said axis of revolution (X-X') greater than the angle of inclination ($\beta, \gamma$) with respect to this same axis of revolution (X-X') of the inner face of a deflector disposed radially further inside the device.

4. The turbomachine according to claim 1, wherein the inner radius (R1) of an outermost deflector of a pair of contiguous deflectors is less than or equal to the outer radius (R2) of a deflector located further inside.

5. The turbomachine according to wherein it comprises three deflectors.

6. The turbomachine according to claim 1, wherein at least one of said deflectors has a rectilinear cross section.

7. The turbomachine according to claim 1, wherein at least one of said deflectors has a curved cross section, the concavity whereof is turned toward the particle collecting and storing element.

8. The turbomachine according to claim 1, wherein the collecting and storing element comprises a solid ring coaxial with the axis of revolution (X-X') of the deflectors and which extends in a plane perpendicular or substantially perpendicular to this axis, this ring being continued in the direction of said deflector by a solid outer annular edge and by a solid inner annular edge, said collecting and storing element being disposed facing the deflector.

9. The turbomachine according to claim 1, wherein said attachment means comprise a planar annular flange coaxial with the axis of revolution (X-X') of the deflectors and perpendicular to it, and which is continued in the direction of the particle collecting and storing element by a cylinder with a longitudinal axis coaxial with said axis of revolution (X-X'), in that said cylinder is perforated with several openings for passage of the air flow and in that said annular flange is perforated with several openings for passage of attachment members.

* * * * *